US009588844B2

(12) United States Patent
Bissett et al.

(10) Patent No.: US 9,588,844 B2
(45) Date of Patent: Mar. 7, 2017

(54) CHECKPOINTING SYSTEMS AND METHODS USING DATA FORWARDING

(71) Applicant: Stratus Technologies Bermuda Ltd., Hamilton (BM)

(72) Inventors: Thomas D. Bissett, Shirley, MA (US); Paul A. Leveille, Grafton, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 119 days.

(21) Appl. No.: 14/571,408

(22) Filed: Dec. 16, 2014

(65) Prior Publication Data

US 2015/0205673 A1 Jul. 23, 2015

Related U.S. Application Data

(60) Provisional application No. 61/921,730, filed on Dec. 30, 2013.

(51) Int. Cl.
*G06F 11/00* (2006.01)
*G06F 11/14* (2006.01)
*G06F 9/455* (2006.01)

(52) U.S. Cl.
CPC ...... *G06F 11/1407* (2013.01); *G06F 9/45533* (2013.01); *G06F 11/1438* (2013.01);
(Continued)

(58) Field of Classification Search
CPC ............ G06F 9/45533; G06F 11/1438; G06F 11/1471; G06F 11/1484; G06F 11/1492; G06F 2201/815; G06F 2201/84
See application file for complete search history.

(56) References Cited

U.S. PATENT DOCUMENTS 3,736,566 A 5/1973 Anderson et al.
4,590,554 A 5/1986 Glazer et al.
(Continued)

FOREIGN PATENT DOCUMENTS

EP 0 750 261 A1 12/1996
EP 0 974 912 A2 1/2000
(Continued)

OTHER PUBLICATIONS

International Search Report and the Written Opinion of the International Searching Authority for International Application No. PCT/US2014/070456, mailed Jun. 22, 2015, 16 pages.
(Continued)

*Primary Examiner* — Joshua P Lottich
(74) *Attorney, Agent, or Firm* — K&L Gates LLP

(57) ABSTRACT

In one aspect, the invention relates to a fault tolerant computing system. The system includes a primary virtual machine and a secondary virtual machine, wherein the primary and secondary virtual machines are in communication, wherein the primary virtual machine comprises a first checkpointing engine and a first network interface, wherein the secondary virtual machine comprises a second network interface, wherein the first checkpointing engine forwards a page of memory of the primary virtual machine to the second virtual machine such that the first checkpointing engine can checkpoint the page of memory without pausing the primary virtual machine.

11 Claims, 2 Drawing Sheets

(52) U.S. Cl.
CPC ...... *G06F 11/1471* (2013.01); *G06F 11/1484* (2013.01); *G06F 11/1492* (2013.01); *G06F 2201/815* (2013.01); *G06F 2201/84* (2013.01)

(56) References Cited

U.S. PATENT DOCUMENTS

| | | | |
|---|---|---|---|
| 4,751,702 A | 6/1988 | Beier et al. |
| 4,758,951 A | 7/1988 | Sznyter, III |
| 4,831,581 A | 5/1989 | Rubinfeld |
| 5,099,485 A | 3/1992 | Bruckert et al. |
| 5,155,809 A | 10/1992 | Baker et al. |
| 5,157,663 A | 10/1992 | Major et al. |
| 5,193,162 A | 3/1993 | Bordsen et al. |
| 5,235,700 A | 8/1993 | Alaiwan et al. |
| 5,333,265 A | 7/1994 | Orimo et al. |
| 5,357,612 A | 10/1994 | Alaiwan |
| 5,404,361 A | 4/1995 | Casorso et al. |
| 5,465,328 A | 11/1995 | Dievendorff et al. |
| 5,568,380 A | 10/1996 | Brodnax et al. |
| 5,615,403 A | 3/1997 | Bissett et al. |
| 5,621,885 A | 4/1997 | Del Vigna, Jr. |
| 5,694,541 A | 12/1997 | Service et al. |
| 5,721,918 A | 2/1998 | Nilsson et al. |
| 5,724,581 A | 3/1998 | Kozakura |
| 5,745,905 A | 4/1998 | Larsson et al. |
| 5,787,485 A | 7/1998 | Fitzgerald, V et al. |
| 5,790,397 A | 8/1998 | Bissett et al. |
| 5,802,265 A | 9/1998 | Bressoud et al. |
| 5,892,928 A | 4/1999 | Wallach et al. |
| 5,896,523 A | 4/1999 | Bissett et al. |
| 5,913,021 A | 6/1999 | Masubuchi |
| 5,918,229 A | 6/1999 | Davis et al. |
| 5,923,832 A | 7/1999 | Shirakihara et al. |
| 5,933,838 A | 8/1999 | Lomet |
| 5,948,112 A | 9/1999 | Shimada et al. |
| 5,958,070 A | 9/1999 | Stiffler |
| 5,968,185 A | 10/1999 | Bressoud et al. |
| 6,023,772 A | 2/2000 | Fleming |
| 6,035,415 A | 3/2000 | Fleming |
| 6,067,550 A | 5/2000 | Lomet |
| 6,088,773 A | 7/2000 | Kano et al. |
| 6,098,137 A | 8/2000 | Goodrum et al. |
| 6,105,148 A | 8/2000 | Chung et al. |
| 6,141,769 A | 10/2000 | Petivan et al. |
| 6,158,019 A | 12/2000 | Squibb |
| 6,289,474 B1 | 9/2001 | Beckerle |
| 6,301,677 B1 | 10/2001 | Squibb |
| 6,397,242 B1 | 5/2002 | Devine et al. |
| 6,401,216 B1 | 6/2002 | Meth et al. |
| 6,438,705 B1 | 8/2002 | Chao et al. |
| 6,453,343 B1 | 9/2002 | Housel, III et al. |
| 6,526,447 B1 | 2/2003 | Giammaria |
| 6,622,263 B1 | 9/2003 | Stiffler et al. |
| 6,678,369 B2 | 1/2004 | DeMent et al. |
| 6,687,849 B1 | 2/2004 | Cherf |
| 6,718,538 B1 | 4/2004 | Mathiske |
| 6,823,474 B2 | 11/2004 | Kampe et al. |
| 6,907,477 B2 | 6/2005 | Altman et al. |
| 6,954,877 B2 | 10/2005 | Earl et al. |
| 6,978,400 B2 | 12/2005 | Hickson et al. |
| 7,039,663 B1 | 5/2006 | Federwisch et al. |
| 7,055,063 B2 | 5/2006 | Leymann et al. |
| 7,058,846 B1 | 6/2006 | Kelkar et al. |
| 7,076,555 B1 | 7/2006 | Orman et al. |
| 7,080,375 B2 | 7/2006 | Martin |
| 7,162,698 B2 | 1/2007 | Huntington et al. |
| 7,206,964 B2 | 4/2007 | Moser et al. |
| 7,240,172 B2 | 7/2007 | Chong, Jr. et al. |
| 7,249,118 B2 | 7/2007 | Sandler et al. |
| 7,289,433 B1 | 10/2007 | Chmara et al. |
| 7,299,337 B2 | 11/2007 | Traut et al. |
| 7,310,721 B2 | 12/2007 | Cohen |
| 7,363,538 B1 | 4/2008 | Kundu et al. |
| 7,380,039 B2 | 5/2008 | Miloushev et al. |
| 7,392,433 B2 | 6/2008 | Sahoo et al. |
| 7,545,752 B2 | 6/2009 | Krautkremer et al. |
| 7,577,934 B2 | 8/2009 | Anonsen et al. |
| 7,603,391 B1 | 10/2009 | Federwisch et al. |
| 7,743,381 B1 | 6/2010 | Tran |
| 7,934,035 B2 | 4/2011 | Miloushev et al. |
| 8,117,496 B2 | 2/2012 | Bashir et al. |
| 8,145,945 B2 | 3/2012 | Lee |
| 8,533,382 B2 | 9/2013 | Scales et al. |
| 8,769,533 B2 | 7/2014 | North |
| 8,806,266 B1 | 8/2014 | Qu et al. |
| 8,812,907 B1 | 8/2014 | Bissett et al. |
| 8,898,509 B2 * | 11/2014 | Mummidi ......... G06F 17/30289 |
| | | | 714/4.11 |
| 9,164,843 B1 * | 10/2015 | Havemose .......... G06F 11/1438 |
| 9,459,895 B2 * | 10/2016 | Venkitachalam ... G06F 9/45533 |
| 2002/0073249 A1 | 6/2002 | French et al. |
| 2002/0073276 A1 | 6/2002 | Howard et al. |
| 2002/0078308 A1 | 6/2002 | Altman et al. |
| 2002/0147890 A1 | 10/2002 | Saulsbury et al. |
| 2003/0005102 A1 | 1/2003 | Russell |
| 2003/0005356 A1 | 1/2003 | Franckowiak et al. |
| 2003/0084376 A1 | 5/2003 | Nash et al. |
| 2003/0163763 A1 | 8/2003 | DeLano |
| 2004/0001435 A1 | 1/2004 | Wong |
| 2004/0010663 A1 | 1/2004 | Prabhu |
| 2004/0143776 A1 | 7/2004 | Cox |
| 2004/0158549 A1 | 8/2004 | Matena et al. |
| 2004/0193658 A1 | 9/2004 | Kawamura et al. |
| 2004/0193945 A1 | 9/2004 | Eguchi et al. |
| 2004/0199812 A1 | 10/2004 | Earl et al. |
| 2004/0267897 A1 | 12/2004 | Hill et al. |
| 2005/0015702 A1 | 1/2005 | Shier et al. |
| 2005/0201373 A1 | 9/2005 | Shimazu et al. |
| 2005/0229039 A1 | 10/2005 | Anderson et al. |
| 2005/0251785 A1 | 11/2005 | Vertes et al. |
| 2005/0256826 A1 | 11/2005 | Hambrick et al. |
| 2006/0047925 A1 | 3/2006 | Perry |
| 2006/0062142 A1 | 3/2006 | Appanna et al. |
| 2006/0112297 A1 | 5/2006 | Davidson |
| 2006/0179147 A1 | 8/2006 | Tran et al. |
| 2007/0027985 A1 | 2/2007 | Ramany et al. |
| 2007/0174484 A1 | 7/2007 | Lussier et al. |
| 2009/0113109 A1 | 4/2009 | Nelson et al. |
| 2009/0193298 A1 | 7/2009 | Mukherjee |
| 2010/0077164 A1 | 3/2010 | Stiffler et al. |
| 2010/0095074 A1 | 4/2010 | Ganesh et al. |
| 2010/0107158 A1 | 4/2010 | Chen et al. |
| 2010/0235591 A1 | 9/2010 | Akutsu et al. |
| 2010/0325500 A1 | 12/2010 | Bashir et al. |
| 2011/0161639 A1 | 6/2011 | Knauth et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 | 7/2011 | Lee |
| 2011/0208908 A1 * | 8/2011 | Chou .................. G06F 11/1662 |
| | | | 711/112 |
| 2011/0289345 A1 | 11/2011 | Agesen et al. |
| 2011/0289417 A1 | 11/2011 | Schaefer et al. |
| 2012/0011401 A1 | 1/2012 | Ranganathan et al. |
| 2012/0011508 A1 | 1/2012 | Ahmad |
| 2012/0084520 A1 | 4/2012 | Chou et al. |
| 2012/0084782 A1 * | 4/2012 | Chou .................. G06F 11/1484 |
| | | | 718/102 |
| 2012/0191908 A1 * | 7/2012 | North ................... G06F 11/2097 |
| | | | 711/112 |
| 2012/0266018 A1 | 10/2012 | Tanaka |
| 2012/0284721 A1 | 11/2012 | Antani et al. |
| 2013/0024855 A1 | 1/2013 | North |
| 2013/0067277 A1 * | 3/2013 | Mummidi ........... G06F 11/2097 |
| | | | 714/19 |
| 2013/0212205 A1 | 8/2013 | Flockhart et al. |
| 2013/0311992 A1 * | 11/2013 | Fuente ................ G06F 11/1484 |
| | | | 718/1 |
| 2014/0040206 A1 | 2/2014 | Ramakrishnan et al. |
| 2014/0201574 A1 * | 7/2014 | Manchek .......... G06F 11/1407 |
| | | | 714/38.13 |
| 2014/0215461 A1 | 7/2014 | Laor et al. |

(56) References Cited

U.S. PATENT DOCUMENTS

| | | | | |
|---|---|---|---|---|
| 2014/0282514 | A1* | 9/2014 | Carson | G06F 9/45533 718/1 |
| 2015/0007172 | A1* | 1/2015 | Hudzia | G06F 9/45533 718/1 |
| 2015/0009804 | A1 | 1/2015 | Koponen et al. | |
| 2015/0082087 | A1 | 3/2015 | Jacobs et al. | |
| 2015/0095907 | A1 | 4/2015 | Jacobs et al. | |
| 2015/0127809 | A1 | 5/2015 | Akella et al. | |
| 2015/0149999 | A1 | 5/2015 | Ramanathan et al. | |
| 2015/0180761 | A1 | 6/2015 | Watanabe | |
| 2015/0205672 | A1 | 7/2015 | Bissett et al. | |

FOREIGN PATENT DOCUMENTS

| | | |
|---|---|---|
| GB | 2 268 817 A | 1/1994 |
| JP | 10-320326 A | 12/1998 |
| JP | 2004-206212 A | 7/2004 |
| WO | 92/17842 A1 | 10/1992 |
| WO | 99/26133 A2 | 5/1999 |

OTHER PUBLICATIONS

PCT International Search Report and The Written Opinion of the International Searching Authority for International Application No. PCT/US2014/070453, mailed Aug. 21, 2015, 24 pgs.

Clark et al., "Live Migration of Virtual Machines," NSDI '05 $2^{nd}$ Symposium on Networked Systems Design & Implementation, USENIX Association, May 4, 2005, pp. 273-286.

Cully et al., "Remus: High Availability via Asynchronous Virtual Machine Replication," The University of British Columbia, Department of Computer Science, 14 pages.

Kim et al., "Process Allocation for Load Distribution in Fault-Tolerant Multicomputers," IEEE Publication, pp. 174-183, 1995.

Nakamikawa et al., "High Performance Fault Tolerant Computer and its Fault Recovery," 1997 IEEE, pp. 2-6.

Tamura, "Modernization of Kemari using HVM with PV Drivers," Nippon Telegraph and Telephone Corporation, NTT Cyber Space Labs, Nov. 20, 2008, 23 pages.

Tamura et al., "Kemari: Virtual Machine Synchronization for Fault Tolerance," NTT Cyber Space Labs, 2 pages.

Tamura, "Kemari: Virtual Machine Synchronization for Fault Tolerance using DomT," Nippon Telegraph and Telephone Corporation, NTT Cyber Space Labs, Jun. 24, 2008, 19 pages.

Tamura et al., "Virtual Machine Synchronization for High Availability Clusters," Nippon Telegraph and Telephone Corporation, NTT Cyber Space Labs, Apr. 17, 2007, 17 pages.

PCT International Search Report for International Application No. PCT/US06/19754, dated Oct. 17, 2007, 3 pages.

Supplementary European Search Report for Application No. EP 06770856, completed Nov. 17, 2010, 6 pages.

PCT International Search Report and PCT Written Opinion of the International Searching Authority for International Application No. PCT/US2014/070461, mailed Apr. 2, 2015, 9 pages.

International Preliminary Report on Patentability from PCT/US2014/070461 dated Jul. 5, 2016.

International Preliminary Report on Patentability from PCT/US2014/070453 dated Jul. 5, 2016.

International Preliminary Report on Patentability from PCT/US2014/070456 dated Jul. 5, 2016.

* cited by examiner

CHECKPOINTING SYSTEMS AND METHODS USING DATA FORWARDING

RELATED APPLICATIONS

This application claims priority to U.S. provisional patent application 61/921,730 filed on Dec. 30, 2013 and owned by the assignee of the current application, the contents of which are herein incorporated by reference in their entirety.

FIELD OF THE INVENTION

The invention relates generally to the field of fault tolerant computing and more specifically to checkpointing, networking and virtualization systems.

BACKGROUND OF THE INVENTION

There are a variety of ways to achieve fault tolerant computing. Specifically, fault tolerant hardware and software may be used either alone or together. As an example, it is possible to connect two (or more) computers, such that one computer, the active computer or host, actively makes calculations while the other computer (or computers) is idle or on standby in case the active computer, or hardware or software component thereon, experiences some type of failure. In these systems, the information about the state of the active computer must be saved periodically to the standby computer so that the standby computer can substantially take over at the point in the calculations where the active computer experienced a failure. This method can be extended to the modern day practice of using a virtualized environment as part of a cloud or other computing system.

Virtualization is used in many fields to reduce the number of servers or other resources needed for a particular project or organization. Present day virtual machine computer systems utilize virtual machines (VM) operating as guests within a physical host computer. Each virtual machine includes its own virtual operating system and operates under the control of a managing operating system or hypervisor executing on the host physical machine. Each virtual machine executes one or more applications and accesses physical data storage and computer networks as required by the applications. In addition, each virtual machine may in turn act as the host computer system for another virtual machine.

Multiple virtual machines may be configured as a group to execute one or more of the same programs. Typically, one virtual machine in the group is the primary or active virtual machine and the remaining virtual machines are the secondary or standby virtual machines. If something goes wrong with the primary virtual machine, one of the secondary virtual machines can take over and assume its role in the fault tolerant computing system. This redundancy allows the group of virtual machines to operate as a fault tolerant computing system. The primary virtual machine executes applications, receives and sends network data, and reads and writes to data storage while performing automated or user initiated tasks or interactions. The secondary virtual machines have the same capabilities as the primary virtual machine, but do not take over the relevant tasks and activities until the primary virtual machine fails or is affected by an error.

For such a collection of virtual machines to function as a fault tolerant system, the operating state, memory and data storage contents of a secondary virtual machine must be equivalent to the operating state, memory and data storage contents of the primary virtual machine. If this condition is met, the secondary virtual machine may take over for the primary virtual machine without a loss of any data. To assure that the state of the secondary machine and its memory is equivalent to the state of the primary machine and its memory, it is necessary for the primary virtual machine periodically to transfer its state and memory contents, or at least changes to the memory contents since the last update, to the secondary virtual machine.

The periodic transfer of data to maintain synchrony between the states of the virtual machines is termed checkpointing. A checkpoint defines a point in time when the data is to be transferred. During a checkpoint, the processing on the primary virtual machine is paused, so that the final state of the virtual machine and associated memory is not changed during the checkpoint interval. Once the relevant data is transferred, both the primary and secondary virtual machines are in the same state. The primary virtual machine is then resumed and continues to run the application until the next checkpoint, when the process repeats.

Checkpoints can either be determined by the passage of a fixed amount of elapsed time from the last checkpoint or by the occurrence of some event, such as the number of memory accesses (termed dirty pages); the occurrence of a network event (such as network acknowledgement output from the primary virtual machine); or the occurrence of excessive buffering on the secondary virtual machine (as compared to available memory) during the execution of the application. Elapsed time checkpointing is considered fixed checkpointing, while event based checkpointing is considered dynamic or variable-rate checkpointing.

Checkpointing is a resource intensive operation that has different operating periods during which the demand for processing cycles increases, such that the demand is uneven between some of the periods. These processor demanding stages can result in increased network latency for out-bound traffic from the VM or other system being checkpointed. A need therefor exists for ways to reduce the cost of checkpoint processing during certain demanding periods and in turn reduce network latency of out-bound traffic.

Embodiments of the invention address this need and others.

SUMMARY OF THE INVENTION

In one aspect, the invention relates to a fault tolerant computing system. In one embodiment, the system includes a first computing device comprising a primary virtual machine and a second computing device comprising a secondary virtual machine, wherein the first computing device and the second computing device are in communication, wherein the primary virtual machine comprises a first checkpointing engine and a first network interface, wherein the secondary virtual machine comprises a second network interface, wherein the first checkpointing engine forwards a page of memory of the primary virtual machine to the secondary virtual machine such that the first checkpointing engine can checkpoint the page of memory without pausing the primary virtual machine. In another embodiment, the first computing device further includes a buffer cache in communication with the checkpointing engine; and a memory tracking module in communication with the checkpointing engine, wherein the buffer cache is configured to receive working set of memory pages and wherein the memory tracking module monitors the memory of the first computing device and identifies when an infrequently used memory page is modified relative to the working set of memory pages in the buffer cache. In yet another embodiment, the first computing device further comprises an I/O module in communication with a network interface and a block interface. In still yet another embodiment, the checkpointing engine pauses the primary virtual machine once a checkpoint is declared.

In one embodiment, the checkpointing engine captures the state of the paused primary virtual machine and restarts the paused primary virtual machine once the state is captured. In another embodiment, the checkpointing engine forwards a page of memory to the secondary virtual machine while the checkpointing engine is idle and the primary virtual machine is running.

In one aspect, the invention relates to a method of distributing checkpointing load in a virtual machine system. The method includes identifying a set of candidate pages for page forwarding based on at least one criterion of a set of criteria; selecting one or more of the candidate pages; and forwarding the candidate pages from a primary virtual machine to a secondary virtual machine while the primary virtual machine is running. In one embodiment, the set of criteria is that: the one or more candidate pages are not elements in a set of working memory, the one or more candidate pages were involved in a storage input or output transfer, and the one or more candidate pages were successfully forwarded during a previous VM operating cycle. In another embodiment, the selection of a candidate page is modified in response to the instruction in the primary virtual machine that modified the page of memory.

In one aspect, the invention relates to a method of reducing processing cycles during one or more high processor demand periods (capture, transfer, act-wait) of the checking pointing cycle. The method can also be implemented to reduce network latency of out-bound traffic in conjunction with alleviating processing demands during one or more high processor demand periods.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DESCRIPTION OF A PREFERRED EMBODIMENT

Figure 1:
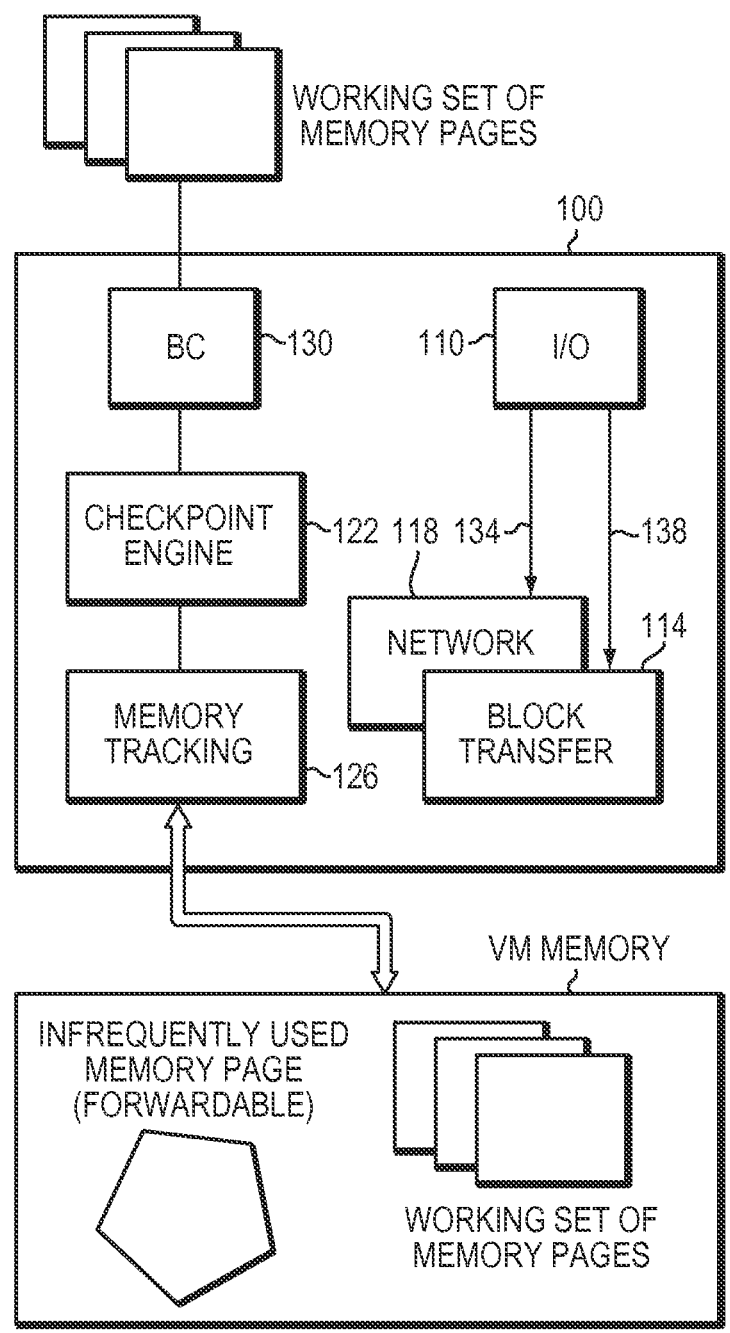
FIG. 1 is a block diagram of an embodiment of a checkpointing engine in a virtual machine constructed in accordance with the invention.

Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In a variable-rate checkpoint system, an excessive checkpoint rate can occur when checkpoint cycles are initiated on the primary virtual machine in response to the occurrence of an event on the primary virtual machine such as outbound network data transmission or traffic or other events which result in a page of memory being modified. Normally, outbound traffic causes an immediate checkpoint cycle to ensure lower-latency exchanges between the primary virtual machine and the computer on the network receiving the transmission from the virtual machine. This is indeed the case for file-level operations such as folder enumeration, file deletion, attribute manipulation, and even single-threaded transaction exchanges.

On a checkpoint based system that monitors a running primary or guest virtual machine's memory page modifications to replicate those state changes to another system, significant latency can occur between the time a checkpoint is deemed necessary and the point at which the guest's out-bound network frames can be published or transmitted. This latency is a function of many factors such as memory speed, processor speed, interconnect speed, interconnect latency, and of course the number of guest pages which need to be delivered. The process of checkpointing a primary virtual machine often results in the pausing of its operations in order to initiate the checkpoint.

Checkpoint processing encounters significant processing demands during the time-critical portion of the cycle which includes the following steps:

1. determining which guest memory pages need to be processed;
2. transferring those pages, in part or in whole;
3. waiting for acknowledgement or 'ACK' frame in response to a prior transmission;
4. publishing (or 'releasing') guest's network frames (if any).

The exact order of these steps may vary from one implementation to another, and may include fewer or more steps. However all implementations will have to deal with the transferring of memory pages, step 2 above. This transfer is where much of the checkpoint time and effort will be spent.

As noted herein, the process of checkpointing a primary virtual machine often results in the pausing of its operations in order to initiate the checkpoint. Various events can trigger a checkpoint as described herein. Unfortunately, given the various events which can declare a checkpoint, numerous pages of memory can require checkpointing.

These pages of memory can include the set of all pages modified between pause and run operations. This results in a distribution of memory pages per checkpoints that is uneven and results in increased delays for the primary virtual machine while the pages of memory are checkpointed.

According to one embodiment of the invention, it is desirable to even-out the distribution of memory pages and reduce the checkpointing load. This can be achieved by selecting pages unlikely to undergo further changes while a primary virtual machine is running for a period of time such as a page forwarding interval. These types of infrequently modified or dirtied pages can be forwarded for checkpointing while the virtual machine continues to run. This approach is in contrast with such infrequently modified or dirtied pages being checkpointed along with frequently modified pages while the VM is paused.

Memory page transfer time can be reduced by selectively using page forwarding with regard to suitable candidate pages as shown in FIG. 1 and described below. This page identification and forwarding process allows an underlying checkpoint mechanism to selectively forward a copy of a guest's or primary virtual machine's modified pages to the remote system, which includes a secondary or standby virtual machine. This page forwarding and subsequent checkpointing can occur as the primary virtual machine is still running.

Referring to FIG. 1, components of a virtual machine 100 are shown. The virtual machine 100 would typically be connected to a second virtual machine (not shown) to achieve a fault tolerant computing system. Network data is buffered by I/O 110 and a notification event alerts a checkpointing engine 122. Storage data (referred to generically as block-IO) is allowed to move more freely between input/output module (I/O) 110 and the block interface 114. The checkpointing engine 122 is in communication with a memory tracking module 126 and a buffer cache 130. Various operational stages of checkpointing engine 122 of FIG. 1 are shown on the left side of FIG. 2.

The virtual machine 100 typically performs a set of core tasks and frequently accesses certain types of stored data. These core tasks and frequently used sets of data affect a certain set of memory pages or region of a given page of memory. This set of pages or regions effectively define a set of working memory which is characteristic of a given virtual machine. This working set is frequently changed and thus memory associated with it is routinely dirtied. In light of these changes, pages of memory in the working group are typically not suitable candidates for forwarding for checkpointing while the virtual machine is running. This follows because the pages of memory are likely to change before a checkpoint can be completed resulting in wasted processing and data exchanges.

Referring to FIG. 1, the checkpointing engine 122 can be configured to forward suitable memory pages from VM memory for checking pointing while the virtual machine 100 continues to run. The working set of memory pages is typically stored in the buffer cache 130. The VM memory includes a working set of memory pages and infrequently modified memory pages. The infrequently modified memory pages are the set from which forwardable pages are typically selected. The memory tracking module 126 can monitor the memory of the virtual machine and identify when an infrequently used memory page is dirtied or modified relative to the working set of memory pages in the buffer cache. The dirtying of such a memory page, once detected, allows such a page to be evaluated for forwarding or immediately forwarded to the secondary virtual machine for checkpointing.

Figure 2:
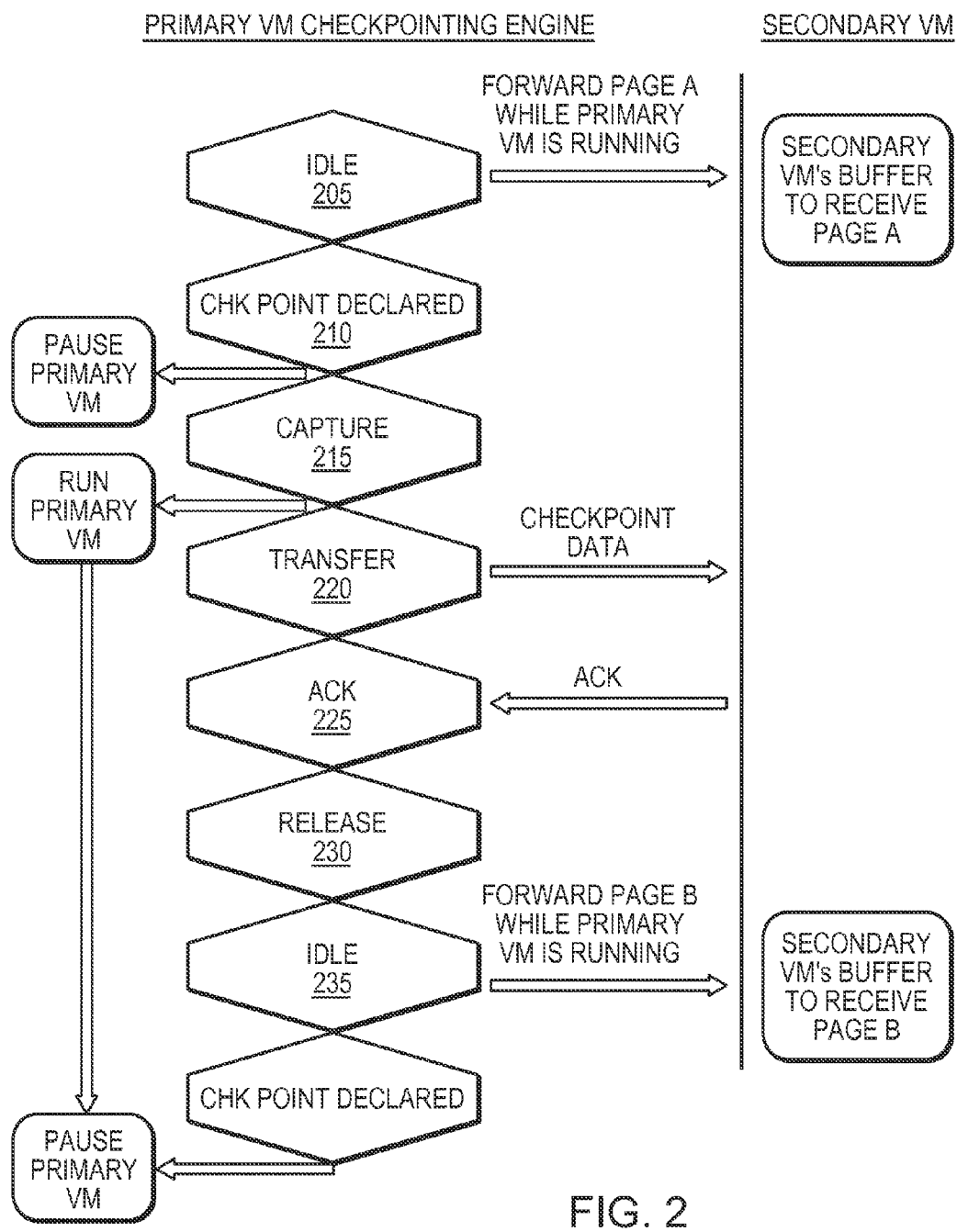
FIG. 2 is a schematic diagram showing operating stages of a checkpointing engine suitable for performing page forwarding to a secondary virtual machine in accordance with the invention.

When the checkpointing engine 122 is idle, network data (if any) remains in a buffered state by 110, and will only be released after the next checkpoint reaches its Commit/Release stage (230). At that time, network data (if any) is transferred 134 from the I/O module to the network interface 118. When a checkpoint is declared, the virtual machine 100 is paused and the dirty page data is processed by the checkpointing engine 122. Referring to FIG. 2, in one embodiment, in the case of page forwarding, this forwarding process can occur during the ACK (225), the Release (230) and the Idle operating states (235) of VM 100. However, page forwarding can also occur during other stages as appropriate.

In FIG. 2, checkpoint data is sent as part of Transfer stage (220). When a checkpoint is declared, for example because of an out-bound network frame being received by the I/O module 110, that frame is buffered as the checkpoint engine 122 progresses through its stages. In the case of the present invention, selection and forwarding of dirty pages for the next checkpoint can begin. The receipt of the checkpoint ACK message (sent by the other host) is shown as stage (225) in FIG. 2, at which point the Release stage (230) occurs and the buffered network traffic is allowed to pass to the network interface 118. Meanwhile, page forwarding may be used to shorten the duration of the next iteration.

As noted above, forwarding of a selected page of memory occurs in parallel with VM 100 executing or running. As a result, the forwarded page may not be the final version of the page. Further, because there is the possibility of further changes to a forwarded page, the checkpoint mechanism must have a means of detecting modifications that occur between the forwarded copy and the final page (at checkpoint time).

One way to detect modifications that occur between the forwarded page and the final page is to reset the dirty-bit associated with the page prior to copying it. This reset approach is coupled with flushing the page table entry from the processor's translation lookaside buffer (TLB). Then, at checkpoint time, the step of determining if the page has been modified again is performed. Another approach to detecting modifications that occur between the forwarded page and the final page is to keep a local copy of the forwarded page and use that copy for direct comparison at checkpoint time. In either case, the objective is to reduce the amount of guest page data that must be transferred at checkpoint time. In turn, this process reduces the latency of the checkpoint cycle and a primary virtual machine's network 'Release' shown as stage (230) in FIG. 2.

As part of the process of distributing a portion of the checkpointing load while the primary virtual machine is still running, it is useful to identify or establish various categories of information and tasks that can be performed by the checkpointing engine or other components of a virtual machine. These tasks and categories of information include:
- real-time knowledge of VM pages to be included in the upcoming checkpoint cycle;
- real-time 'copy' access to VM pages to be forwarded;
- a means of distinguishing when post-copy changes have been made to a VM page;
- an efficient means of forwarding a primary VM page to the another VM, where it is buffered until the next checkpoint;
- a means of properly handling and applying multiple version of guest page data, when necessary.

The secondary or standby virtual machine or host computer receiving forwarded primary or guest virtual machine page data, shown on right side of FIG. 2, is required to hold that data in a manner that associates the data with the next checkpoint. When the time comes to apply that checkpoint, only the latest version of a page's data needs to be applied to the standby virtual machine's memory.

Selection of Data/Memory Pages for Forwarding

The benefit of page forwarding can be lost or reduced if those pages must be retransmitted again during the same checkpointing cycle. Hence, the selection of which pages to send is an important part of a successful implementation. A candidate for a forwardable page is evaluated to include at least one of these characteristics:

1. The candidate page of memory is outside of the recent working set of the guest virtual machine's activities as determined by page-use tracking by the checkpoint mechanism.
2. The candidate page of memory was involved in a storage 10 transfer, indicating the page is likely to have a temporal relationship with its content (such as a guest virtual machine's file cache or other buffering layer in the guest).

3. The candidate page of memory was successfully forwarded during some previous cycle (and not subsequently re-forwarded in the same cycle) as a result of it being dirtied.

These selection criteria can be performed using one or more components of virtual machine 100 such as the checkpointing engine 122 working in concert with memory tracking 126 and other components as necessary.

In more detail and referring to FIG. 2, an operational diagram of events and methods relating to page forwarding and checkpointing occurring in sequence for a primary virtual machine and a secondary virtual machine is shown for an embodiment of the invention. The left side shows stages or processes for the primary VM checkpointing engine. The primary VM is paused as the checkpointing engine enters a checkpointing state (210) also referred to as declaring a checkpoint. The right side shows components or processes of the secondary VM. The primary virtual machine is either running (executing one or more applications) or paused. The checkpointing engine includes various stages and processes as shown on the left side of FIG. 2. The checkpointing engine may be idle (205) until a checkpoint occurs (210) at which time the checkpointing engine pauses the primary virtual machine.

A page of memory A, identified as forwardable based on compliance with one or more selection criteria, is forwarded while the primary VM is running. This occurs before a checkpoint is declared (210) during which the primary VM is paused. While the primary virtual machine is paused, the state of the primary virtual machine is captured (215). Once the state data is captured (215), the checkpointing engine resumes the primary virtual machine which again executes one or more applications.

The captured state data is then transferred (220) to the secondary virtual machine. The primary VM starts to run, leaving a paused state, in parallel with the Transfer state (220) or after the Transfer state (220) depending on implementation. During the states following the transfer (220) of the checkpoint data, page forwarding can occur as shown by the left-most arrows which bound the Transfer (220), the ACK (225), the Release (230), and the Idle (235) stages. Once the data has been transferred, the checkpointing engine waits for an acknowledgement (ACK) to be received 225 from the secondary virtual machine or agent thereof, indicating that the data has been received. At this point, the checkpoint data is released or committed (230), for example by releasing 134 a frame of buffered data to the network interface 118. The checkpointing engine next enters an Idle state (235) until the next checkpoint occurs. As shown in FIG. 2, two pages A and B are forwarded to the secondary VM for processing while the primary VM runs, instead of including them with pages of routinely modified data. The actual forwarding is managed by the checkpointing engine 122 using real-time information from the memory tracking 126 component over network connections not shown. This results in the checkpointing load being distributed over time. In turn, this can result in a decrease in overall checkpointing time in the range from about 1% to about 10%. When the primary VM is engaged in disk-to-disk file copy transactions, the page forwarding implementation results in demonstrable performance improvements.

In another embodiment, the checkpointing engine 122 working in concert with memory tracking 126 can inspect the instruction in virtual machine 100 at the time that a page is first modified. The type of instruction used to modify the page of memory may provide a hint to the intended use of the page. This hint can be used to determine if a page is a candidate for a forwardable page.

For example, in the x86 architecture, REP MOVS (repeat move string instruction) that writes an entire page to zero is commonly used to clear a page of memory prior to returning that page to the available memory pool. Such a page is a good candidate for a forwardable page. Conversely, a page modified using the XCHG (exchange) instruction is a poor candidate because the XCHG is commonly used to implement semaphores, implying that this page will be frequently modified.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or deferring" "committing" or "checkpointing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A method of distributing checkpointing load in a virtual machine system having a primary virtual machine with a memory comprising memory pages and a checkpointing engine and a secondary virtual machine having a memory comprising memory pages, the method comprising the steps of:
    identifying a set of one or more candidate pages in the memory of the primary virtual machine for page forwarding based on at least one criterion of a set of criteria consisting of the one or more candidate pages that are not elements in a set of working memory; the one or more candidate pages that were involved in a storage input or output transfer; and the one or more candidate pages that were successfully forwarded during a previous VM operating cycle;
    selecting one or more of the candidate pages; and
    forwarding the selected candidate pages from the primary virtual machine to the secondary virtual machine while the primary virtual machine is running.

2. The method of claim 1 wherein the selection of a candidate page is modified in response to an instruction in the primary virtual machine that modified the candidate page of memory.

3. The method of claim 1 further comprising performing checkpointing relative to the one or more of the candidate pages.

4. The method of claim 1 wherein the step of forwarding the selected one or more candidate pages comprises the steps of:
    restarting the primary VM;
    transferring the one or more candidate pages;
    receiving an ACK from the secondary virtual machine;
    releasing the one or more candidate pages; and
    placing the checkpointing engine into an idle state.

5. The method of claim 1 further comprising the step of declaring a checkpoint prior to identifying a set of one or more candidate pages.

6. The method of claim 1 further comprising the step of pausing the primary VM once a checkpoint is declared.

7. A fault tolerant computing system comprising:
    a first computing device comprising:
        a primary virtual machine comprising:
            a memory;
            a first checkpointing engine;
            a buffer cache in communication with the first checkpointing engine;
            a memory tracking module in communication with the first checkpointing engine; and
            a first network interface;
    a second computing device comprising:
        a secondary virtual machine comprising:
            a memory; and
            a second network interface;
    wherein the first computing device and the second computing device are in communication,
    wherein the buffer cache is configured to receive a working set of memory pages,
    wherein the memory tracking module monitors the memory of the first computing device and identifies when an infrequently used memory page is modified relative to the working set of memory pages in the buffer cache, and
    wherein the first checkpointing engine forwards a page of memory of the primary virtual machine to the secondary virtual machine such that the first checkpointing engine can checkpoint the page of memory without pausing the primary virtual machine.

8. The fault tolerant computing system of claim 7 wherein the first computing device further comprises an I/O module in communication with a network interface and a block interface.

9. The fault tolerant computing system of claim 7 wherein the first checkpointing engine pauses the primary virtual machine once a checkpoint is declared.

10. The fault tolerant computing system of claim 9 wherein the first checkpointing engine captures the state of the paused primary virtual machine and restarts the paused primary virtual machine once the state is captured.

11. The fault tolerant computing system of claim 9 wherein the first checkpointing engine forwards a page of memory to the secondary virtual machine while the first checkpointing engine is idle and the primary virtual machine is running.

* * * * *